United States Patent [19]
Jordan et al.

[11] 3,922,335
[45] Nov. 25, 1975

[54] PROCESS FOR PRODUCING CARBON BLACK

[75] Inventors: Merrill E. Jordan, Walpole; Allan C. Morgan, Sudbury, both of Mass.

[73] Assignee: Cabot Corporation, Boston, Mass.

[22] Filed: Feb. 25, 1974

[21] Appl. No.: 445,569

[52] U.S. Cl. ............... 423/450; 23/259.5; 423/455; 423/456
[51] Int. Cl.² ................... C09C 1/48; C09C 1/50
[58] Field of Search .................. 423/450, 455, 456; 23/259.5

[56] References Cited
UNITED STATES PATENTS

| | | | |
|---|---|---|---|
| 2,781,247 | 2/1957 | Krejci | 423/456 |
| 3,046,096 | 7/1962 | Heller et al. | 423/455 |
| 3,565,586 | 2/1971 | Kiyonaga | 23/259.5 |
| 3,567,395 | 3/1971 | Henderson et al. | 423/456 X |
| 3,595,618 | 7/1971 | Kiyonaga et al. | 423/456 |
| 3,619,140 | 11/1971 | Morgan et al. | 423/455 |

*Primary Examiner*—Edward J. Meros
*Attorney, Agent, or Firm*—Kenneth W. Brown; Barry R. Blaker; Lawrence A. Chaletsky

[57] ABSTRACT

There is disclosed herein a process for the production of oil furnace carbon blacks, which process is characterized by exceptionally high throughput, efficient use of heat, facile scale-up, high yields and the ability to produce high quality novel and desirable carbon blacks. The process involves the use of a staged reaction system whereby there is provided, seriatim, a combustion zone, a feedstock injection zone and a carbon forming zone.

9 Claims, 4 Drawing Figures

PROCESS FOR PRODUCING CARBON BLACK

FIELD OF THE INVENTION AND PRIOR ART

The present invention relates generally to the so-called furnace-type method for manufacturing carbon blacks. More particularly, our invention is concerned with maximizing the actual benefits realizable in such processes from the use of high energy combustion reactions in generating (1) the heat required for decomposition of liquid carbon forming feedstocks, and (2) the kinetic energy required to efficiently and rapidly disperse said feedstock into the reaction mixture.

In U.S. Pat. No. 2,851,337, Heller, Sept. 9, 1958, there is disclosed a method for producing furnace carbon black comprising the initial production of a blast flame gas stream by combustion of a fluid fuel and an oxygen-containing gas; flowing the resulting blast flame gas stream through a constricted zone having gently tapered convergent walls; transversely injecting a feedstock "make" hydrocarbon into said blast flame gas stream at about the point of maximum constriction and from the periphery thereof; and conducting the resulting reaction mixture stream through a very gradually diverging enclosure wherein carbon black is formed. While the primary emphasis of Heller relates to use of gaseous hydrocarbon feedstocks, where liquid feedstock hydrocarbons are to be employed it is specifically disclosed that such liquid feedstocks are intended to be injected into the blast flame gas stream as a preformed atomizate thereof, for instance by use of a bi-fluid atomizing apparatus such as disclosed in U.S. Pat. No. 2,659,662. Accordingly, Heller fails to recognize or appreciate use of the kinetic and thermal energy of his high velocity blast flame gases to achieve atomization of liquid feedstocks into the blast flame gas stream.

In U.S. Pat. No. 3,595,618, Kiyonaga et al., July 27, 1971, there is disclosed an oil furnace type carbon black process somewhat similar to that of Heller, supra, with the notable exception that the combustion reaction employed is extremely intense and is predicated on the employment of gases containing high concentrations of oxygen as the oxidant for the fluid fuel. By employment of oxidant gases containing such high concentrations of oxygen there are assured combustion reactions characterized by extremely high heat release rates. The resulting combustion product gas stream is flowed through a constricted zone and a feedstock hydrocarbon is released into said constricted zone, thereby to form the complete reaction mixture. With respect to the methods disclosed for supplying the feedstock into the combustion product gas stream, Kiyonaga et al. propose several alternative methods. In one such method the feedstock is perpendicularly (with respect to the combustion gas stream) fed through a capillary opening located at the periphery of the constricted combustion gas stream. Substantially no further limitations are imposed upon this particularly disclosed manner of feedstock supply except for the patentees' general admonition that, whatever the specific method of feedstock injection employed, said injection should expose the feedstock to the shearing effect of the high velocity combustion gas stream as it passes through the constricted zone. Thus, at column 4, lines 60 to 65 of this patent, it is stated: "Since it is the high velocity of the gases which is depended upon to disperse the feed, it need not be introduced by means of an atomizer or spray nozzle, but may be introduced simply through an unrestricted capillary opening and under merely sufficient pressure to maintain the desired rate of flow." Alternative and equally acceptable methods proposed for the feedstock injection step in Kiyonaga et al. include (a) axial injection of the feedstock into the throat of the constricted combustion gas stream, and (b) tangential injection of the feedstock into the constricted zone so as to initially spread the liquid feedstock as a thin film on the walls of the enclosing apparatus.

In U.S. Pat. No. 3,619,140, Morgan et al., Nov. 9, 1971, there is disclosed a process for the production of oil furnace blacks bearing certain outward resemblances to each of the processes disclosed in the aforementioned Heller and Kiyonaga et al. patents. In the U.S. Pat. No. the disclosed process comprises the achievement of a high energy combustion reaction in combination with transverse injection into the resulting high velocity combustion product gas stream, from a plurality of points about the periphery thereof, of a liquid hydrocarbon feedstock. Said feedstock is injected in the form of a plurality of individual, initially coherent streams thereof and the pressures employed in the injection step are sufficient to result in each feedstock stream having a linear velocity of at least about 100 feet per second as it enters the combustion product gas stream. Accordingly, the Morgan et al. disclosure differs in important respects from either of the Kiyonaga et al. or Heller patents in that critical parameters concerning the coherent penetrating geometry of the feedstock streams and the inlet velocity of each stream form part of the combination so as to assure efficient shearing of the coherent streams into minute droplets by the high velocity combustion product gas stream and sufficient penetration of the coherent feedstock liquid streams into the core of the combustion gas stream so as to prevent premature contact of the feedstock with the hot walls of the enclosing apparatus.

Each of the processes mentioned above discloses a meritorious advance in the art of furnace carbon black production. However, each of these prior art processes suffers from a disadvantage which mitigates strongly against commercial applications thereof. Specifically, said prime disadvantage resides in formidable difficulties encountered in scaling up any of the disclosed processes while maintaining the employment of the high velocity combustion gas or "blast flame". Thus, while principal advantages flowing from each of the processes disclosed in the prior art referenced hereinbefore are explicitly bottomed on the employment of high velocity combustion product gas streams, as a practical matter it has been found difficult to economically scale up said processes to commercially important sizes. More particularly, where liquid feedstocks are to be injected substantially transversely into high velocity combustion product gas streams in a penetrating manner such as to mitigate against occurrence of coking phenomena, it has been the general experience that the requisite pumping pressures to be applied against the feedstock during its injection into a substantially scaled up high velocity combustion product gas stream are either not generally available or involve such complex equipment as to be uneconomic. Accordingly, during scale up of the above-referenced processes, it is generally necessary to either substantially reduce the combustion gas stream velocities, thereby to substantially diminish the potential benefits in yield, throughput and, in some instances, product qualities or, alternatively, to limit the extent of scale up of the furnace equipments, for instance, furnace arrangements of the hereinbefore referenced art wherein the diameters of the disclosed cylindrically shaped liquid feedstock injection zones are no more than, say, about four or six inches. In accordance with the improvement of the present invention, however, this scale up problem has been largely overcome.

OBJECTS OF THE INVENTION

A prime objective of the present invention is to provide an improved process for continuously manufacturing carbon black using a high energy combustion reaction as a heat and kinetic energy source in atomizing and converting a liquid carbon forming feedstock to carbon black.

Another object of our invention is to produce high quality carbon blacks from liquid carbon forming feedstocks while operating at high throughput rates for production equipment of a given size.

Another object is to provide a process which results in increased carbon black yields from a given combustion reaction.

Yet another object of the invention is to provide a process by which novel carbon black products having desirable properties can be produced.

Still another object of the invention is to provide a process for the production of carbon black which process may be readily scaled to typical commerical production rates.

Other objects and advantages of the invention will in part be obvious to those skilled in the art and will in part appear hereinafter in the detailed description which follows.

SUMMARY OF THE INVENTION

In fulfillment of the above and other objects and advantages, the present process comprises, seriatim: (1) continuously burning a suitable fluid fuel in an enclosed combustion zone and continuously discharging the resulting high temperature gaseous combustion products from the downstream end of said combustion zone, (2) causing said discharged gaseous combustion products to take the form of an annular high velocity stream flowing at a velocity of at least Mach 0.35, (3) injecting substantially transversely into said high velocity annular combustion product gas stream from both the interior and exterior peripheries thereof a plurality of individual coherent penetrating streams of a liquid carbon forming feedstock, the total rate of feedstock injection being proportioned in accordance with the mass flow rate and composition of said combustion gas stream as to assure the attainment of carbon forming conditions in the resulting reaction mixture, (4) maintaining the resulting reaction mixture in an enclosed zone for a sufficient period of time and under conditions suitable to allow carbon particle formation to occur therein, (5) quenching the resulting carbon black-containing mixture, and (6) separating and collecting the carbon black product from entrainment in flue gases.

THE DRAWINGS

DETAILED DESCRIPTION OF THE INVENTION

Figure 1:
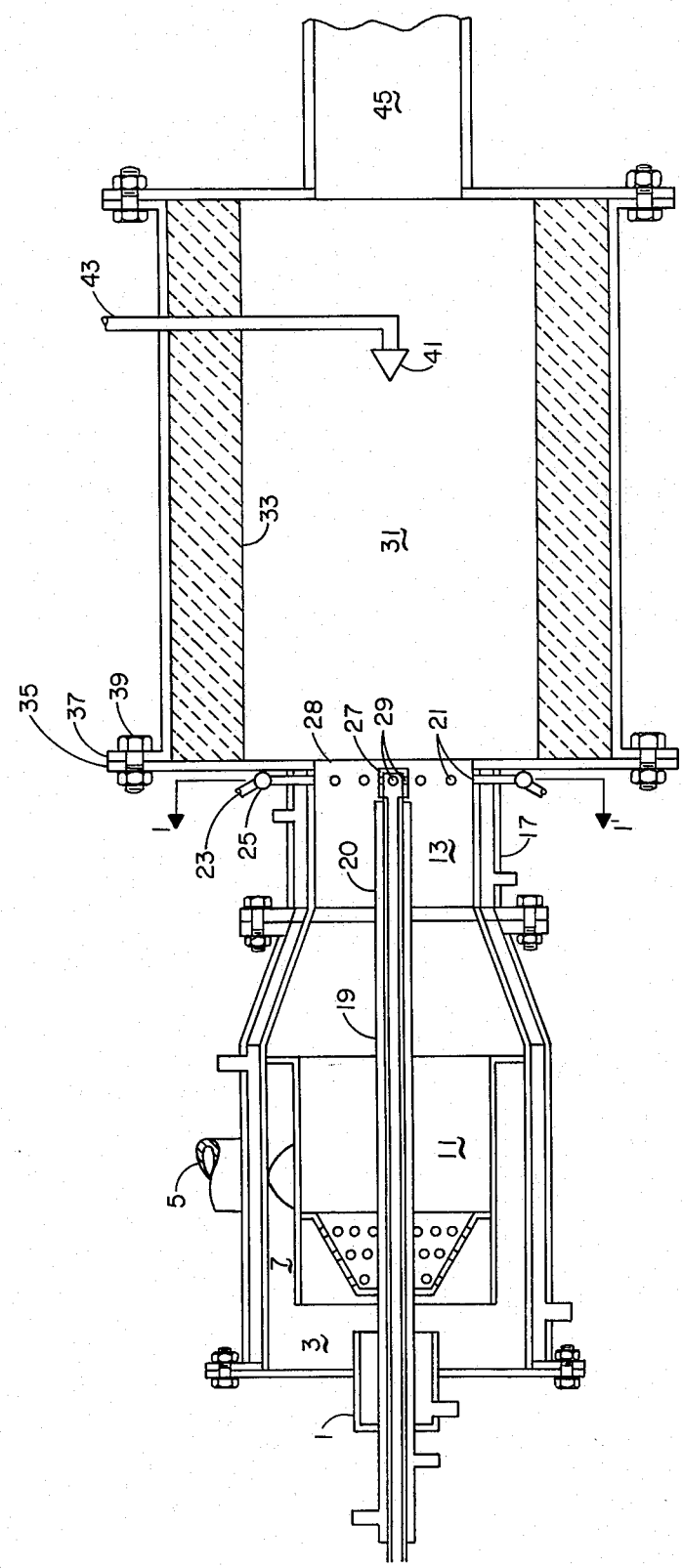
FIG. 1 is a schematic, diagrammatic, longitudinal, sectional view of apparatus suitable for use in the practice of the invention.
Figure 2:
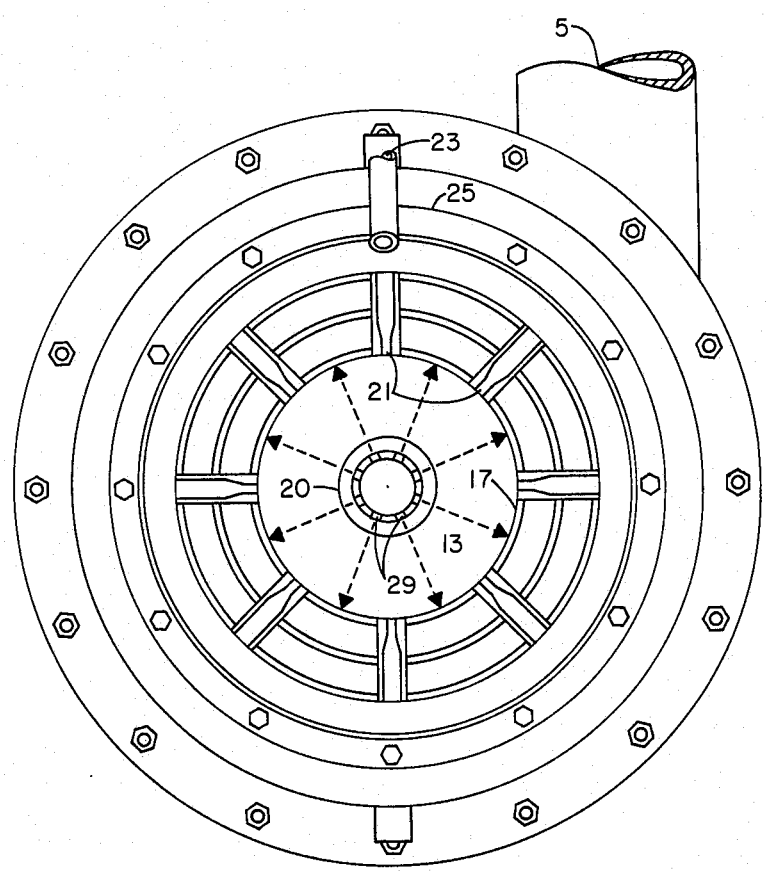
FIG. 2 is a schematic, diagrammatic, cross-sectional view of the liquid feedstock injection zone 13 of FIG. 1 taken through section line 1—1' thereof.

Referring now to FIGS. 1 and 2, wherein like reference numerals refer to like features, effectuation of the process of the invention is achieved as follows. Into mixing chamber 3 there is charged through conduit 1 a fluid fuel and through conduit 5 and annulus 7 a gaseous oxidant therefor. The resulting gaseous combustion mixture flows through perforated flame holder 9 into combustion chamber 11 wherein ignition and substantially complete combustion of said fluid fuel/oxidant mixture is performed. The resulting combustion product gases are discharged from the downstream end of combustion chamber 22 and are caused to flow at a high linear velocity of at least Mach 0.35 and preferably at a velocity of at least Mach 0.4 through annular feedstock injection zone 13, the exterior periphery of said annular zone 13 being defined by inner wall 18 of conduit 17 and the interior periphery thereof being defined by the surface of terminal portion 20 of axially oriented feedstock injection probe 19. As employed herein, the term "Mach" refers to the numerical quotient obtained by dividing the actual linear velocity of the combustion product gas stream by the velocity of sound therein. Further, as will be appreciated by those skilled in the art, the velocity of sound in a given gas stream will be highly dependent upon the temperature of the gas stream as well as upon its composition.

Having provided a high velocity combustion product gas stream having an annular cross-sectional geometry, a liquid carbon forming feedstock is injected substantially transversely into said combustion product gas stream from both the inner and outer peripheries thereof. Said injection is achieved, in the case of the exterior periphery of the annular stream, by charging a liquid carbon forming feedstock, which is normally preferably preheated to below the temperature at which substantial coking thereof takes place, through a plurality of substantially transversely oriented, substantially unrestricted, orifices 21. Supply of the liquid feedstock to each said orifice 21 is conveniently achieved by flowing the feedstock, under pressure, through supply conduit 23 into a distribution manifold 25, which manifold then supplies each orifice 21. Similarly, liquid feedstock is injected substantially transversely into the annular combustion gas stream from the interior periphery thereof by supplying said feedstock, under pressure, through axial probe 19 which may be conveniently liquid-cooled and which terminates in end-cap 27 having a plurality of transversely oriented, substantially unrestricted, orifices 29 therethrough.

Subsequent to the feedstock injection step outlined above, it is then necessary to provide sufficient residence time of the resulting reaction mixture under conditions which will foster carbon particle formation. This can be done by discharging said reaction mixture from the downstream end of said injection zone 13 into a suitable reaction space 31. Thus, as shown in FIG. 1, reaction chamber 33 can be connected to the downstream end of injection zone 13 by means of mating flanges 35 and 37 provided with a suitable ring-row of bolt fasteners 39. The reaction space 31 of chamber 33 should be generally unobstructed and it is generally much preferred that it be relatively abruptly and at least somewhat larger in cross-sectional area than the discharge end of injection zone 13. By adherence to these last mentioned geometric principles, there is further assured the achievement of rapid dispersal of the injected feedstock into the flowing mass of hot combustion product gases without premature contact of the unconverted or partially converted feedstock with the walls of the enclosing apparatus.

The length of the reaction chamber 33 will then be determined by the residence time to be allowed for carbon formation under full scale operations. Although the exact residence time for each case will naturally depend upon the particular reaction conditions and the carbon black product quality desired, as previously mentioned said residence time will usually fall in the range from about 0.5 to 100 milliseconds for most conventional carbon blacks. Accordingly, in order to provide the capability for terminating the carbon forming reaction at the desired instant and thus controlling residence time, a suitable quenching means adapted to rapidly lower the temperature of the reaction mixture is provided. For instance, a spray nozzle 41 is shown schematically in FIG. 1. In operation a quench fluid to be introduced, usually water, is fed to one or more of said such nozzles 41 under suitable pressure by means of entry conduits 43. For greater flexibility in regard to controlling the residence time for a given throughput, more than one spray nozzle can be provided. For example, additional nozzles 41 can be located at intervals along the length of chamber 33. Since the ultimate termination of the carbon forming reaction is usually ordained by the quenching step, the reaction mixture leaving reaction chamber 33 through exit 45 will generally comprise a hot aerosol of carbon black suspended in by-product gases. After leaving exit 45 the hot aerosol is subjected to the usual finishing steps of further cooling and solid particle separation and collection as conventionally practiced in the furnace carbon black art.

In the combustion step the fluid fuel can be any readily combustible gas, vapor or liquid stream including such common components as $H_2$, CO, $CH_4$, acetylene, alcohols, kerosene, etc. However, generally speaking, there is a preference for fuels with relatively high carbon contents, particularly hydrocarbons. For example, methane-rich streams such as natural gas and modified or enriched natural gas are excellent fuels, as are other hydrocarbon-rich streams such as various petroleum gases, liquids and refinery by-products including $C_2$ through $C_5$ fractions, fuel oils, etc.

It should be noted that the phrase "oxidant gas" as employed for the purposes of the present specification and the claims appended hereto includes any vaporous oxidant which, when mixed in appropriate proportions with the fluid fuel component, results in an energetically combustible mixture. Accordingly, suitable oxidant gases include: air, oxygen or chlorine or mixtures of substantially non-oxidizing or inert gases such as nitrogen, carbon dioxide, argon, etc. with one or more of the oxidant species mentioned above wherein the total oxidant gas concentration of the overall mixture is at least about 20 volume percent.

The proportions of oxidant gas to fluid fuel should generally be restricted on the fuel-rich side to those mixtures having adiabatic flame temperatures of at least about 2400°F. However, at the fuel-lean end of the scale, proportions of oxidant gas to fluid fuel can be used which are so high as to yield adiabatic flame temperatures below 2400°F provided that provision is made (such as by virtue of the particular liquid feedstock rate or composition employed) to assure that said temperature level will be ultimately attained when the feedstock reacts with the excess oxidant gas present in said hot combustion product stream.

Normally, therefore, the temperature levels required of our process will be attained during the combustion step. However, when the proportion of oxidant gas to fluid fuel employed in the combustion step is decidedly on the fuel-lean side, the maximum temperature in our process may well occur after the carbon forming liquid feedstock has been introduced and is partially reacted with the residual oxidant present in the hot combustion product gas stream. In this regard, although the oxidant gas supplied to the combustion reaction can vary from about 50% to about 500% of that theoretically required for complete combustion of the fluid fuel, the preferred oxidant gas/fluid fuel ratios will ordinarily be found to reside within the range of from about 70% to about 350% of theoretical.

In order that the plurality of initially coherent penetrating streams of liquid carbon forming feedstock to be injected into the annular combustion gas stream be efficiently atomized and dispersed and in order that the extremely high throughputs of which the present process is capable be fully realized, it is important that said annular combustion gas stream have a velocity of at least Mach 0.35 at the locus of injection of the liquid feedstock. Preferably, said combustion gas stream will normally attain a velocity of at least Mach 0.4 at the locus of injection of the feedstock and, even more preferably, will reside in the range of Mach 0.5 to 0.8. Many methods are available to the practitioner of the instant invention for ensuring that the velocity of the combustion product gases will possess the necessary kinetic energy to properly disperse the feedstock injected thereinto.

For instance, the combustion reaction itself may often be controlled by the fuel and/or oxidant gas inputs thereinto so as to achieve a resulting combustion product gas stream having a minimum velocity of Mach 0.35 as it flows through the annular feedstock injection zone 13. However, it should also be recognized that the particular design of the apparatus employed can also have a very profound effect upon the ultimately attained velocity of the combustion product gas stream as it flows by the locus of liquid feedstock injection. Thus, for example, by conducting the combustion product gases from their producing chamber 11 through a constricted annular feedstock injection zone 13, significant further acceleration thereof can often be achieved.

Substantially any combustible liquid carbon forming feedstock having a carbon content of at least 75% and preferably above about 85% by weight of the feedstock can be converted to useful carbon black products in the process of the invention. Accordingly, the particular liquid carbon forming feedstock composition to be employed is subject to wide variation. For instance, liquid or liquifiable carbon-containing materials such as benzene, toluene, xylene, mesitylene, cumene, durene; linear or alicyclic hydrocarbons such as hexane, octane, dodecane, cyclohexane and cyclopentane, paraffinic oils, petroleum distillates, waxes, etc., are all generally suitable as carbon forming liquid feedstocks in the practice of the invention. However, it will normally be preferred to utilize residual aromatic or ethylene tars, petroleum distillates or cycle stocks arising from the fractionation and/or distillation processes of refinery operations.

In any case, it is vitally important that the injection of said liquid carbonaceous feedstock into the high velocity, annular combustion product stream (1) be performed as a plurality of individual, relatively small, initially unfragmented and coherent streams, (2) be substantially transverse relative to the flow axis of the combustion product gas stream, and (3) be directed from both the exterior and interior peripheries of the annular combustion product gas stream. Whatever the number of orifices 21 and 29 employed, moreover, it is all important in the interests of stable process performance and product quality that each individual feedstock stream be charged into the hot combustion product stream in such a manner as to not significantly contact said feedstock stream with the enclosing walls of the apparatus prior to thorough mixing thereof with the hot combustion gases and the formation of solid carbon particles. Accordingly, it is important that each injected feedstock stream initially maintain its coherent nature and penetrate the annular combustion product gas stream without substantial dilution thereby to a depth of at least 15% of the annular cross-sectional dimension taken at the point of entry of said feedstock stream. Also, it is clearly preferred that the coherent penetrating streams of liquid feedstock injected from a plurality of loci on their respective exterior and interior peripheries of the annular combustion product gas stream neither impinge directly one upon the other nor upon the surfaces of their opposite peripheries of injection zone 13. Accordingly, it is preferred that the penetration of such opposed feedstock streams should not normally exceed about 50% of the annular cross-sectional dimension. It is also normally desirable, as depicted clearly as dashed lines in FIG. 2, that projections drawn through the center lines of interior orifices 29 to the enclosing surface of the exterior periphery of the annular combustion gas stream meet said enclosing surface of the exterior periphery at points intermediate opposed pairs of adjacent exterior orifices 21. Accordingly, by adherence to the liquid feedstock injection techniques described herein, in combination with adherence to the previously disclosed annular combustion product gas stream flowing at high velocity, there is assured a highly efficient and rapid fracture of the initially coherent feedstock streams into minute droplets and the efficient and rapid dispersal thereof into the combustion product gas stream so as to rapidly form a substantially homogeneous reaction mixture. Thus, by adherence to the principles of the presently disclosed and claimed invention, highly efficient use is made of the thermal and kinetic energy of the combustion gases, which efficient use contributes substantially to the high throughput and yield benefits usually attainable in the process and to the high quality of the carbon blacks producible in accordance therewith.

Obviously, performance of the aforementioned feedstock injection step in accordance with the invention will be contingent upon such parameters as, the velocity of the annular combustion product stream flowing past the points of feedstock injection, the geometry and dimensions of the enclosing apparatus, the dimensions and number of feedstock injection orifices 21 and 29, the rates of feedstock injection employed, the pressures utilized in feedstock injection, etc. Accordingly, those skilled in the art will recognize that the extent of penetration of the individual feedstock streams in coherent form into the hot combustion gases may be controlled by appropriate control of any one or combination of several process variables and/or the geometry of the producing apparatus. Moreover, it will be generally understood by those skilled in the art that the initially coherent penetrating feedstock injection criteria essential in the practice of the present invention can normally be pre-determined by taking the above parameters fully into account or can generally be directly observed and controlled during operations.

When making a given grade of carbon black with a given liquid carbon forming feedstock, the feedstock supply rate employed will depend largely upon the amount of available heat and uncombined oxidant (if any) in the hot combustion product gas stream. For most of the grades of carbon black of primary interest the amount of feedstock will be adjusted in conjunction with the amounts of fluid fuel and oxidant gas supplied so that the overall percent combustion for the process (assuming theoretically complete oxidation of all components to $CO_2$, $H_2$, etc.) will fall between about 20% and about 50%; however, our process can also be operated to advantage using appropriate reactants at percent combustion values of as low as about 15% or as high as about 65% to produce useful carbon black products.

With respect to the actual carbon forming step of the process, important parameters reside in the size and shape of the enclosed reaction space 31 provided between the injection of the feedstock into the combustion product gas stream and the quenching of the reaction mixture. Thus, for a given volumetric rate of throughput of said reaction mixture, the total volume of the space between the loci of feedstock injection and the quenching of the reaction mixture will be determinative of the residence time in the main carbon forming reaction zone. The present process is generally capable of producing high quality carbon blacks at unusually short residence times, e.g., all the way down to about 0.5 millisecond or even less. For most grades of blacks, optimum conditions will usually provide residence times in the range from about 1 to about 100 milliseconds. Of course, longer residence times up to about 500 milliseconds or even several seconds can often be used if desired and may sometimes prove helpful in achieving certain special product properties.

There follow a number of non-limiting illustrative examples:

EXAMPLE 1

Apparatus of the general type shown in FIG. 1 is employed having the following important dimensions:

Combustion Chamber 11: volume 4 ft$^3$

Cylindrical Conduit 17: length 11 inches; internal diameter 10.4 inches

Orifices 21: nine transversely oriented 0.046 inch diameter orifices spaced equiangularly in a single plane about the circumference of conduit 17. Said orifices 21 are located about 5.5 inches upstream from discharge end 28 of conduit 17.

Reaction Chamber 33: a heat insulated, refractory-lined cylindrical tunnel having a length of 18 ft and an internal diameter of 18 inches.

Quench means comprising a plurality of water spray nozzles 41 located in chamber 33 3 feet downstream from discharge end 28 of conduit 17.

In a control run, hereinafter referred to as "Run A", no axial probe 19 is employed. The fluid fuel employed in the combustion reaction is natural gas having a methane content of 95.44 percent and a wet heating value of 925 BTU/SCF. Air is employed as the gaseous oxidant and Enjay A.C., a petroleum refinery cracker recycle stock, is employed as the liquid carbon forming feedstock. Said liquid feedstock has the following composition:

| | | |
|---|---|---|
| Carbon (%) | 89.4, | 89.5 |
| Hydrogen (%) | 8.19, | 8.08 |
| H/C | 1.08 | |
| Sulfur (%) | 1.8 | |
| Asphaltenes | 1.5, | 1.4 |
| Specific Gravity (60/60°F) (ASTM D-287) | 1.068 | |
| A.P.I. Gravity (60/60°F) (ASTM D-287) | +0.9 | |
| Viscosity, SUS at 130°F (ASTM D-88) | 266, 264 | |
| SUS at 210°F (ASTM D-88) | 52.0, | 52.1 |
| Sediment (%) | 0.30 | |
| Ash (%) | 0.002 | |
| Sodium (ppm) | 0.94 | |
| Potassium (ppm) | 0.04 | |
| GLC Simulated Distillation: | | |
| Initial Boiling Point, °F | 654 | |
| 50% Boiling Point, °F | 798 | |
| BMCI (from gravity and viscosity) | 120 | |
| BMCI (from grav. and 50% boiling point) | 119 | |
| UV Ring Distribution: | | |
| 2-Ring Compounds (%) | 7.4 | |
| 3-Ring Compounds (%) | 24.0 | |
| Pyrenes (%) | 16.7 | |
| Other 4-Ring Compounds (%) | 25.9 | |
| 5-Ring Compounds (%) | 0.0 | |

Employing the above-described materials and equipment Run A is accomplished by charging the natural gas fluid fuel at a rate of 36.5 KSCFH and the air oxidant at a rate of 411 KSCFH into combustion chamber 11 wherein the gas mixture is burned. The oxidant air is heated to a temperature of about 700°F prior to entry thereof into the combustion chamber 11. The resulting combustion product gases are conducted through conduit 17 and are determined to have a velocity therethrough of about Mach 0.53 at the plane of orifices 21. The liquid feedstock, preheated to about 500°F, is injected through orifices 21 at a total rate of about 405 U.S. gallons per hour under a supply pressure of about 310 p.s.i.g. The resulting reaction mixture is then discharged into and conveyed through reaction chamber 33. Said reaction mixture is quenched to a temperature of about 1375°F by means of water spray nozzles 41 and is subjected to the further conventional finishing steps of further cooling by indirect heat exchange and separation and collection of the carbon black product by means of bag filtration. By means of a viewing peep-sight (not shown) located at the rear of combustion chamber 11, the injection of the feedstock streams emanating from orifices 21 is observed and each said stream is seen to be projected into the core of the combustion gas stream as a discrete coherent jet to a depth of from 20 to 25% of the diameter of cylindrical conduit 17. Under these conditions carbon black product is collected at a rate of about 2000 lbs/hour and the overall percent combustion in the process is determined to be about 41.3%. The carbon black product is subjected to several analyses, the details and results of which analyses are set forth below.

Tinting Strength

Tinting strength represents the relative covering power of a pelletized carbon black when incorporated in a 1 to 37.5 weight ratio with a standard zinc oxide (Florence Green Seal No. 8 made and sold by New Jersey Zinc Co.), dispersed in an epoxidized soybean oil type plasticizer (Paraplex G-62 made and sold by Rohm and Haas Co.) and compared to a series of standard reference blacks tested under the same conditions. More particularly, the test involves the mulling of the carbon black, zinc oxide, and plasticizer ingredients in such proportions that the resulting ratio of carbon

| | |
|---|---|
| S | 0.005 |
| | .663 |
| | .005 |
| | .181 |
| | .849 |
| | 1532 ft³/burn | black to zinc oxide is 1 to 37.5. Reflectance measurements utilizing a Welch Densichron apparatus are then obtained from a film cast on a glass plate and the measured readings are compared to carbon black standards having known tinting strengths. The tinting strengths of the carbon black standards are determined utilizing an arbitrarily assigned value of 100% for the tinting strength of a standard SRF carbon black. In this instance, as is conventionally done, the standard SRF carbon black arbitrarily assigned a value of 100% for tinting strength measurement purposes is Sterling S or Sterling R semi-reinforcing furnace blacks made by Cabot Corporation. Each of the Sterling R or Sterling S reference blacks is characterized by having, among other properties, BET nitrogen surface areas of about 23 m²/g, a dibutyl phthalate oil absorption value of about 65 to 70 lbs. oil/100 lbs. black and average particle diameters of about 800 angstroms as determined by electron microscopy. The only noteworthy difference between these tint reference standard blacks is that Sterling R carbon black is in a fluffy form while the Sterling S carbon black is in pelleted form. Accordingly, the particular SRF black selected for reference standard purposes is signalled by the fluffy or pelleted state of the unknown blacks to be measured for tinting strengths. The Sterling R or Sterling S semi-reinforcing carbon black is thus considered as the primary reference standard for determining tinting strengths of the other blacks.

Furthermore, other carbon blacks may be utilized as reference standards for establishing tinting strength values covering the range of about 30% to about 250 percent. The tinting values of such secondary standard blacks are determined relative to the primary SRF standard having the arbitrarily assigned tinting strength value of 100%. In this manner, a series of blacks having a wide range of tinting strength values is made available so as to provide reference blacks that approximate as closely as possible the black to be measured. Exemplary carbon blacks employed as auxiliary tinting strength standards for purposes of the above procedure include the following blacks made by Cabot Corporation. The analytical properties set forth in the table below are determined in accordance with the test procedures disclosed in the present application.

| Analytical Properties | Sterling MT (Medium Thermal) | Sterling FT (Fine Thermal) | Vulcan 6H | Vulcan 9 |
|---|---|---|---|---|
| Tinting Strength, % of SRF Standard | 31 | 56 | 220 | 252 |
| Iodine Surface Area, m²/g | 5.0 | 8.4 | 109.6 | 118.5 |
| DBP Absorption, cc/100 g | 33.6 | 35.9 | 131.4 | 116.9 |

Accordingly, employing the test method outlined above, the carbon black product of control run A is determined to have a tinting strength value of 278%.

DBP Absorption

In accordance with the procedure set forth in ASTM D-2414-65T, now designated as ASTM D-2414-70, absorption characteristics of pelleted carbon blacks are determined. In brief, the test procedure entails adding dibutyl phthalate (DBP) to a pelleted carbon black sample until there occurs a transition from a free-flowing powder to a semi-plastic agglomerate. The value is expressed as cubic centimeters (c.c.) of dibutyl phthalate (DBP) per 100 grams of carbon black. The carbon black of control run A, after pelletizing thereof, is determined to have a DBP absorption value of 129 cc/100 gms black.

Iodine Surface Area

In this procedure, a carbon black sample is placed into a porcelain crucible equipped with a loose-fitting cover to permit escape of gases and is devolatilized for a 7-minute period at a temperature of 1700°F in a muffle furnace and then allowed to cool. The top layer of calcined carbon black is discarded to a depth of one fourth inch and a portion of the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear, following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a blank sample. Finally, the iodine surface area expressed in square meters per gram is calculated in accordance with the formula $$\frac{(\% \text{ Iodine Adsorbed} \times 0.937 - 4.5)}{\text{Sample Weight}} = \text{Iodine Surface Area}$$

This procedure for determining iodine surface areas of carbon black pellets is designated as Cabot Test Procedure No. 23.1 for purposes of convenience inasmuch as there is still no official ASTM designation. As shown in a Cabot Corporation publication TG-70-1 entitled "Industry Reference Black No. 3" by Messrs. Juengel and O'Brien published on Apr. 1, 1970, the iodine surface area of IRB No. 3 (Industry Reference Black No. 3) is 66.5 m²/g as determined in accordance with Cabot Test Procedure 23.1 referred to hereinabove. Employing this procedure the iodine surface area of the carbon black of control run A is determined to be 105 m²/g.

Tint Factor

In U.S. Pat. No. 3,725,103, Jordan et al., Apr. 3, 1973, specifically incorporated herein by reference, there is disclosed and claimed a family of valuable carbon black products, one of the characterizing features of which resides in a value for the relationship (hereinafter "tint factor") of [tinting strength + 0.6 ($D_a$)] of at least about 317. As is further disclosed in said patent, $D_a$, the apparent diameter of the carbon black in millimicrons, can be obtained by use of the formula:

$$D_n = \frac{2270 + 63.5 \text{ (DBP absorption)}}{\text{Iodine Surface Area}}$$

In the above equations the tinting strength is employed in terms of % of SRF, the DBP absorption is employed in terms of cc/100 gms carbon black and the iodine surface area is employed in terms of m²/gm. Accordingly, having knowledge of the tinting strength, DBP absorption and iodine surface area values of the carbon black of control run A the tint factor therefor is determined by substituting said known values into the equation:

$$\text{Tint Factor} = \text{tinting strength} + 0.6 \left[ \frac{2270 + 63.5 \text{ (DBP)}}{\text{iodine surface area}} \right]$$

Accordingly, the tint factor of the carbon black of control run A is determined to be 338.

$p^H$

The $p^H$ value of a carbon black product can be determined by the method of ASTM D-1512-60. Employing this test procedure the $p^H$ value of the carbon black product of Run A is found to be >4.0.

EXAMPLE 2

Run B is essentially a continuation of Run A with the notable exception that there is coaxially positioned within conduit 17 a water-cooled feedstock injection probe 19 having a 2 inch outside diameter and equipped with an end-cap 27 comprising a ⅛ inch pipe cap having three 0.041 inch diameter orifices 29 perpendicularly oriented and located equiangularly about the circumference thereof. The orifices 29 of said axial probe 19 are longitudinally positioned within conduit 17 so as to be substantially coplanar with respect to peripheral orifices 21. Moreover, each of the three orifices 29 of axial probe 19 is oriented so as to project its associated stream of feedstock towards a point intermediate two adjacent peripheral orifices 21. Taking into account the reduction in total cross-sectional area created by the presence of probe 19, the velocity of the combustion gas stream flowing past orifices 21 and 29 is determined to be Mach 0.53.

Employing the above apparatus, and with substantially no changes from Run A in either the natural gas and air rates into combustion chamber 11 or the quench conditions, liquid feedstock is charged through orifices 21 at a rate of 376 U.S. gallons per hour and through orifices 29 at a rate of 94 U.S. gallons per hour, the total rate of feedstock injection being about 470 U.S. gallons per hour. The feedstock feed pressure is maintained at about 310 p.s.i.g. Under these conditions observation of the feedstock injection zone reveals that each of the feedstock streams emanating from the interior and exterior peripheries of the annular injection zone, penetrates the annular combustion product gas stream in a substantially coherent manner to a depth of from 20 to 25% of the cross-sectional dimension of said stream.

The carbon black product is collected and it is found that the rate of production of said product is about 2,300 lbs/hour and the overall percent combustion of Run B is only about 37.5%. The carbon black product is analyzed and is found to have the following properties:

| | |
|---|---|
| Tinting strength | 273 |
| Iodine surface area | 108 m²/gm |
| DBP absorption | 129 cc/100 gms |
| Tint factor | 331 |
| $p^H$ | >4.0 |

Accordingly, comparison of Runs A and B demonstrates important benefits derivable from practice of process of the invention in terms of substantially improved rate of carbon black production without derogation of product properties and in terms of substantially greater yields of a given carbon black product either per unit of fluid fuel employed in the combustion reaction or per unit of liquid feedstock. Moreover, Run B demonstrates the capability of the process of the invention to produce carbon black products belonging to a new, novel and important family of carbon black products found especially useful in the reinforcement of rubbers and elastomers.

EXAMPLE 3

In this Example, Run C, a control run is achieved wherein the liquid feedstock is injected solely from the exterior periphery of a cylindrical injection zone. The apparatus employed is similar to that of Example 1; however, in the present Example conduit 17 is equipped with nine orifices 21, each of 0.059 inch diameter, and the quench nozzle 41 array is located about 7 feet downstream from discharge end 28 of conduit 17. Also, the liquid feedstock employed is a decant oil having the following composition and properties:

| | | |
|---|---|---|
| Hydrogen (%) | 8.04, | 8.03 |
| Carbon (%) | 90.7, | 91.0 |
| H/C | 1.05 | |
| Sulfur (%) | 1.3 | |
| Asphaltenes (%) | 2.1, | 2.0 |
| API Gravity (at 60/60°F) | +0.9 | |

-continued

| | | |
|---|---|---|
| Specific Gravity (at 60/60°F) | 1.069 | |
| Viscosity, SUS at 130°F | 150.6, | 151.0 |
| SUS at 210°F | 44.6, | 44.7 |
| Sediment (%) | 0.035 | |
| Ash (%) | 0.014 | |
| Sodium (ppm) | 5.7 | |
| Potassium (ppm) | 0.54 | |
| GLC Ring Analysis (% of Aromatics): | | |
| 1-Ring Compounds (%) | 0.9 | |
| 2-Ring Compounds (%) | 6.8 | |
| 3-Ring Compounds (%) | 19.3 | |
| 4-Ring Compounds (%) | 60.0 | |
| 5-Ring and higher Compds. (%) | 13.0 | |
| Water (% Vol) | <0.05 | |
| Flash point (°F, C.O.C.) | 330 | |
| Fire Point (°F, C.O.C.) | 375 | |
| 1bs. C/U.S. Gallon | 8.08 | |

Natural gas having a methane content of 96.61 percent and a wet heating value of 925 BTU/SCF is employed as the fluid fuel.

Employing the above materials and apparatus air, preheated to about 710°F, and natural gas fluid fuel are charged into and burned in combustion chamber 11 at rates of 420.4 KSCFH and 32.25 KSCFH, respectively. The velocity of the resulting combustion product gas stream flowing past orifices 21 of conduit 17 is determined to be about Mach 0.52. Liquid feedstock, preheated to a temperature of about 500°F, is injected into the combustion gas stream through orifices 21 at a rate of about 648 U.S. gallons per hour and at a supply pressure of about 290 p.s.i.g. Also, in accordance with the process disclosed and claimed in U.S. Pat. No. 3,010,794, Friauf et al., Nov. 28, 1961, there is injected into combustion chamber 11 an aqueous solution of KCl at a rate sufficient to provide about 5.4 gms KCl per 100 gallons of liquid feedstock. Visual observation of the feedstock injection discloses that each of the feedstock streams emanating from orifices 21 maintains its coherency to a depth of from 20 to 25% of the diameter of conduit 17. The quench of the carbon black product produced under the above conditions is achieved by spraying sufficient water through nozzles 41 as to reduce the temperature of the reaction mixture to between about 1380° and 1400°F. The carbon black product is collected and it is found that the yield is about 5.38 lbs of carbon black product per U.S. gallon of feedstock. The overall percent combustion of Run C is determined to be about 31.8%. The collected carbon black product is subjected to various analytical determinations with the following results:

| | |
|---|---|
| Tinting strength | 246% SRF |
| Iodine surface area | 75 m²/gm |
| DBP absorption | 113 cc/100 gms |
| Tint factor | 321 |
| $p^H$ | >4.0 |

EXAMPLE 4

In the present Example there is effectuated Run D which is similar to that of Run C with the following apparatus and process changes:

Apparatus a. orifices 21 are each of 0.055 inch diameter;

b. a coaxial water-cooled feedstock injection probe 19 of 2 inch outside diameter is additionally employed having an endcap 27 equipped with three equiangularly spaced and radially oriented orifices 29, each of 0.046 inch diameter, said orifices 29 being positioned in a substantially coplanar manner with respect to orifices 21;

c. quench nozzle array 41 is located about 9 feet downstream from discharge end 28 of conduit 17;

process d. liquid feedstock is injected through orifices 21 at a rate of about 541 U.S. gallons per hour and at a supply pressure of about 280 p.s.i.g.;

e. liquid feedstock is additionally injected through orifices 29 at a rate of about 135 U.S. gallons per hour and at a supply pressure of about 260 p.s.i.g.;

f. the air oxidant charged into combustion chamber 11 is preheated to a temperature of about 680°F; and g. aqueous KCl solution is injected into combustion chamber 11 to provide a concentration of about 7.8 gms KCl per 100 U.S. gallons of liquid feedstock. Substantially no changes from the conditions of Run C are made in either the natural gas or air oxidant rates into combustion chamber 11. The velocity of the combustion product gas stream is determined to be about Mach 0.52. Observation of feedstock injection zone 13 reveals that the feedstock streams emanating from orifices 21 or 29 retain their essentially coherent geometry while penetrating to a depth of from 20 to 25% of the cross-sectional dimension of the annular combustion product gas stream. Under these conditions carbon black product is collected at a yield of about 5.44 lbs per U.S. gallon of the liquid feedstock and the overall percent combustion of Run D is only about 30.8%. Analytical properties of the carbon black product of Run D are as follows:

| | |
|---|---|
| Tinting strength | 246% SRF |
| Iodine surface area | 70 m²/gm |
| DBP absorption | 112 cc/100 gms |
| pH | >4.0 |

EXAMPLE 5

Apparatus of the general type shown in FIG. 1 is employed having the following important dimensions:

Combustion Chamber 11: volume 4.4 ft³

Cylindrical Conduit 17: length 11 inches; internal diameter 12.4 inches

Orifices 21: 12 radially oriented 0.070 inch diameter orifices spaced equiangularly in a single plane about the circumference of conduit 17. The plane of said orifices 21 is located about 5.5 inches upstream from discharge end 28 of conduit 17.

Reaction Chamber 33: a heat-insulated, refractory-lined, two-stage cylindrical tunnel having an overall length of about 30 feet, the internal diameter of the 20 foot long first stage coextensive with discharge end 28 of conduit 17 being 18 inches and the internal diameter of the second stage 10 foot length coextensive with said first stage being 27 inches.

Quench means comprising a plurality of water spray nozzles 41 located 29 feet downstream from the discharge end 28 of conduit 17.

Butane is employed as the fluid fuel for the combustion reaction and a hydrocarbonaceous tar arising as a steam cracker by-product of olefin production is employed as the liquid feedstock. In the control run, hereinafter Run E, air and butane are burned in combustion chamber 11 at the rates of 609 KSCFH and 11.5 KSCFH, respectively, the air being preheated to a temperature of about 700°F prior to entry into combustion chamber 11. The resulting combustion product stream is flowed through conduit 17 and is determined to have a linear velocity of about Mach 0.54 at the location of orifices 21. The liquid feedstock is preheated to about 300°F, is supplied to orifices 21 under a pressure of about 310 p.s.i.g. and is injected into the combustion gas stream at a rate of about 1062 U.S. gallons per hour. Aqueous KCl solution is injected into combustion chamber 11 at a rate proportioned to yield a concentration of about 185 gms KCl per 100 U.S. gallons of feedstock. The feedstock injection zone 13 is observed during operations and the feedstock streams emanating from orifices 21 are determined to penetrate the combustion gas stream in a substantially coherent unfragmented manner to a depth of from 20 to 25% of the diameter of conduit 17. Under these conditions carbon black is produced at a rate of about 5,500 lbs/hour and at a yield of about 5.2 lbs carbon black per U.S. gallon of liquid feedstock. The overall percent combustion of Run E is determined to be about 30.1%. The carbon black product is analyzed and is found to have the following properties:

| | |
|---|---|
| Iodine No. (ASTM 1510) | 94 |
| DBP absorption | 90 cc/100 gms |
| Tinting strength | 225% SRF |

EXAMPLE 6

Run F is a continuation of Run E with the following important apparatus and process changes:

Apparatus a. a coaxial feedstock injection probe 19 of the type described in Example 2 is additionally employed, said probe having an o.d. of 2 inches and the end-cap 27 of which is provided with six 0.052 inch diameter radially oriented orifices 29 spaced equiangularly about the circumference thereof, said probe being inserted to a depth sufficient to locate orifices 29 in a substantially coplanar manner with respect to orifices 21;

Process b. liquid feedstock is injected through orifices 21 at a rate of about 975 U.S. gallons per hour and at a supply pressure of about 215 p.s.i.g.;

c. Liquid feedstock is also injected through orifices 29 at a rate of about 240 U.S. gallons per hour and at a supply pressure of about 215 p.s.i.g., thereby yielding a total feedstock injection rate of about 1,215 U.S. gallons per hour;

d. the oxidant air supplied to combustion chamber 11 is preheated to about 625°F;

e. the KCl solution is supplied at a rate proportioned to yield a concentration of about 162 gms KCl per 100 U.S. gallons of liquid feedstock.

The velocity of the combustion product gas stream flowing past orifices 21 and 29 is determined to be about Mach 0.54, taking into account the reduction in cross-sectional area of the stream caused by the presence of probe 19. Feedstock injection zone 13 is visually observed and each of the streams of feedstock emanating from orifices 21 and 29 is determined to penetrate, without substantial loss of coherency, into the annular combustion gas product stream to a depth of from 20 to 25% of the annular cross-sectional dimension thereof. Under the conditions of Run F carbon black is collected at a rate of about 6,300 lbs per hour and at a yield of about 5.25 lbs carbon black product per U.S. gallon of liquid feedstock. The overall percent combustion of Run F is determined to be only about 26.9%. Analysis of the carbon black product reveals the following properties:

| | |
|---|---|
| Iodine No. (ASTM 1510) | 84 |
| DBP absorption | 117 ccs/100 gms |
| Tinting strength | 205% SRF |

EXAMPLE 7

Run G is a continuation of Run F with the following process differences:

a. aqueous KCl solution is injected at a rate proportioned to yield a concentration thereof of about 500 gms per 100 U.S. gallons of liquid feedstock; and b. preheating of the oxidant air supplied to combustion chamber 11 is reduced to and maintained at about 600°F.

Under these conditions carbon black product is produced at a rate of about 6,300 lbs/hour and at a yield of about 5.25 lbs carbon black per U.S. gallon of liquid feedstock. The overall percent combustion of Run G is only about 27.0%. The properties of the collected carbon black product are as follows:

| | |
|---|---|
| Iodine No. | 84 |
| DBP absorption | 77 ccs/100 gms |
| Tinting strength | 229% SRF |

Obviously, the above examples and description of the present process are exemplary in nature and many changes can be made thereto without departing from the spirit and intended scope of the invention.

Figure 3:
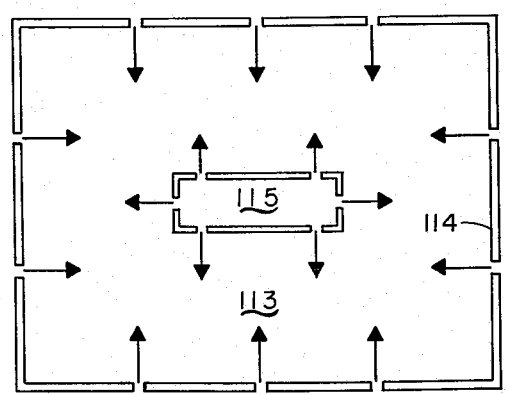
FIG. 3 is a schematic, diagrammatic, cross-sectional view of another suitable liquid feedstock injection zone for use in the practice of the invention.

For instance, while the description appearing hereinbefore has been limited, for purposes of clarity, to annular combustion gas streams having a generally circular cross-section, it is obvious that the operative principles of the process are also adaptable to operations wherein the annular combustion gas stream has a geometry other than circular, for instance, an ovoid, oblong, square or rectangular cross-sectional geometry. One such suitable embodiment is shown schematically in FIG. 3 wherein there is depicted a feedstock injection zone 113 having an exterior peripheral wall 114 of rectangular cross-section and which wall 114, in consort with axially oriented feedstock supply probe 115, also of rectangular cross-section, defines a rectangular annular feedstock injection zone 113.

Figure 4:
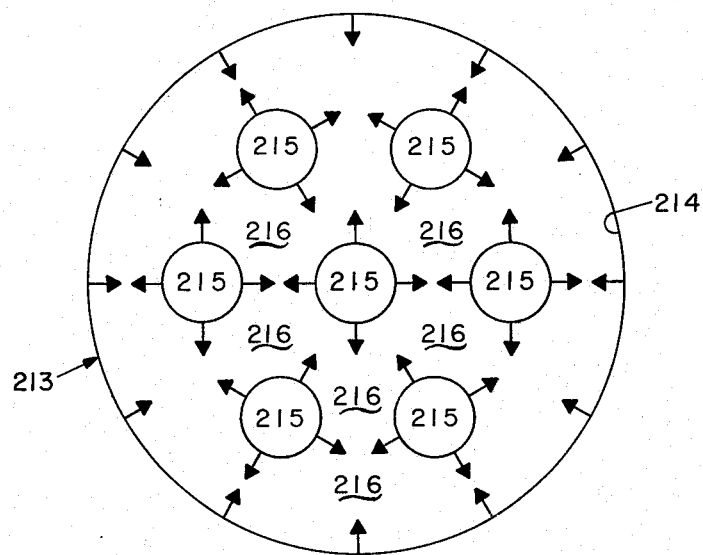
FIG. 4 is a schematic, diagrammatic, cross-sectional view of yet another liquid feedstock injection zone suitable for use in the practice of the invention.

Also, in FIG. 4, there is schematically depicted a feedstock injection zone 213 which comprises an overall exterior defined by cylindrical enclosing wall 214 and a plurality of individual, axially aligned feedstock probes 215 which are in spaced relationship one from the other and from the wall 214. In this configuration, a plurality of essentially annular spaces 216 are defined between adjacent probes 215 and between the exteriormost probes 215 and enclosing wall 214. Of course, the particular arrangement depicted in FIG. 4 is substantially more complex than those of FIGS. 1 through 3; however, it is illustrative of the breadth to which the principles of the invention may be successfully practiced.

What is claimed is:

1. A process for producing carbon black which comprises: establishing an enclosed stream of hot combustion gases having a linear velocity sufficient to atomize and to disperse liquid carbon forming feedstock; injecting liquid feedstock in the form of a plurality of individual coherent streams substantially transversely into the combustion gas stream from the exterior periphery thereof; injecting liquid feedstock in the form of a plurality of individual coherent streams outwardly and substantially transversely into the combustion gas stream from at least one location in the interior thereof; each of the coherent streams of feedstock being caused to penetrate the combustion gas stream to a depth sufficient to avoid significant contact of the feedstock with apparatus prior to mixing thereof with the hot combustion gas stream and forming solid carbon particles; quenching the reaction mixture and collecting carbon black product.

2. The process of claim 1 wherein each of the coherent streams of feedstock is caused to penetrate into the combustion gas stream to a depth of between 15 and 50% of the cross-sectional dimension thereof.

3. The process of claim 1 wherein the velocity of the combustion gas stream at the loci of the injections of the liquid feedstock thereinto is at least Mach 0.35.

4. The process of claim 1 wherein the velocity of the combustion gas stream at the loci of the injections of the liquid feedstock thereinto is between Mach 0.4 and Mach 0.8.

5. The process of claim 1 wherein the injections of the liquid feedstock are substantially coplanar.

6. The process of claim 1 wherein the combustion gas stream has an essentially circular cross-section.

7. The process of claim 1 wherein the combustion gas stream has an essentially rectangular cross-section.

8. The process of claim 1 wherein the injection of liquid feedstock outwardly and substantially transversely occurs from a plurality of locations across the cross-section of the combustion gas stream.

9. The process of claim 1 wherein each coherent stream of the substantially transverse outward injection is projected towards a point intermediate adjacent feedstock streams injected from the exterior periphery of the gas stream.

* * * * *